(12) United States Patent
Salter et al.

(10) Patent No.: US 9,849,830 B1
(45) Date of Patent: Dec. 26, 2017

(54) TAILGATE ILLUMINATION

(71) Applicant: Ford Global Technologies, LLC, Dearborn, MI (US)

(72) Inventors: Stuart C. Salter, White Lake, MI (US); Paul Kenneth Dellock, Northville, MI (US); Christopher Anthony Danowski, Rochester, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/421,971

(22) Filed: Feb. 1, 2017

(51) Int. Cl.
| | |
|---|---|
| *B60Q 1/00* | (2006.01) |
| *B60Q 3/00* | (2017.01) |
| *B60Q 3/30* | (2017.01) |
| *B62D 33/027* | (2006.01) |
| *B60Q 1/24* | (2006.01) |
| *F21V 5/04* | (2006.01) |
| *F21V 9/16* | (2006.01) |
| *B60R 19/48* | (2006.01) |
| *B60Q 1/22* | (2006.01) |

(52) U.S. Cl.
CPC ............... *B60Q 3/30* (2017.02); *B60Q 1/24* (2013.01); *B60R 19/48* (2013.01); *B62D 33/0273* (2013.01); *F21V 5/04* (2013.01); *F21V 9/16* (2013.01); *B60Q 1/22* (2013.01)

(58) Field of Classification Search
CPC . B60Q 1/22; B60Q 1/24; B60Q 1/245; B60Q 1/26; B60Q 1/2619; B60Q 3/30; B60Q 3/50; B60Q 3/60; B60Q 3/66; B60Q 3/68; B60R 19/48; B62D 33/0273
USPC .............. 362/485, 496, 509–512, 520–523, 362/540–545
See application file for complete search history.

(56) References Cited

U.S. PATENT DOCUMENTS

| | | | |
|---|---|---|---|
| 2,486,859 A | 11/1949 | Meijer et al. | |
| 4,743,058 A * | 5/1988 | Fedrigo | B62D 33/0273 296/180.1 |
| 5,053,930 A | 10/1991 | Benavides | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |

(Continued)

FOREIGN PATENT DOCUMENTS

| | | |
|---|---|---|
| CN | 101337492 A | 1/2009 |
| CN | 201169230 Y | 2/2009 |

(Continued)

OTHER PUBLICATIONS

ANZO USA/Toyota Tundra 14-15 LED Tailgate Spoiler 5-Function—Tail Gate Bar—Universal Lights; last access Oct. 26, 2016; one page.

*Primary Examiner* — Jason Moon Han
(74) *Attorney, Agent, or Firm* — Jason Rogers; Price Heneveld LLP

(57) ABSTRACT

A vehicle tailgate includes a substrate operable between open and closed positions and defining an inboard surface, an outboard surface and a top surface. A light assembly is positioned on the substrate. A first lens is positioned over the inboard surface and the top surface. A second lens is positioned over the top surface and the outboard surface. A plurality of light sources is positioned between the substrate and the first and second lenses.

18 Claims, 8 Drawing Sheets

(56) References Cited

U.S. PATENT DOCUMENTS

| | | |
|---|---|---|
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,799,873 B2 | 10/2004 | Fox |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,834,750 B1 | 11/2010 | Hertz et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Kuks et al. |
| 2003/0179548 A1 | 9/2003 | Becker et al. |
| 2004/0213088 A1 | 10/2004 | Fuwausa |
| 2005/0146888 A1 | 7/2005 | Metcalf |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0321141 A1 | 12/2013 | Ariemma et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0300463 A1 | 10/2014 | Russ |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

* cited by examiner

TAILGATE ILLUMINATION

FIELD OF THE DISCLOSURE

The present disclosure generally relates to tailgates and cargo boxes, and more particularly, to illuminated tailgates and cargo boxes.

BACKGROUND OF THE DISCLOSURE

Tailgates allow access to the cargo boxes of vehicles for storage of items. Accordingly, illumination of cargo boxes and tailgates may be advantageous.

SUMMARY OF THE DISCLOSURE

According to one aspect of the present disclosure, a vehicle tailgate includes a substrate operable between open and closed positions and defining an inboard surface, an outboard surface and a top surface. A light assembly is positioned on the substrate. A first lens is positioned over the inboard surface and the top surface. A second lens is positioned over the top surface and the outboard surface. A plurality of light sources is positioned between the substrate and the first and second lenses.

According to another aspect of the present disclosure, a vehicle includes a cargo box defining a cargo space. A tailgate substrate is coupled to the cargo box and operable between open and closed positions. The substrate defines an inboard surface, an outboard surface and a top surface. A light assembly is positioned over the inboard and outboard surfaces. The light assembly is configured to emit light into the cargo space when the tailgate is in both the open and closed positions.

According to yet another aspect of the present disclosure, a vehicle includes a cargo box defining a cargo space. A tailgate is coupled to the cargo box and operable between the open and closed positions. The tailgate includes a substrate defining an inboard surface, an outboard surface and a top surface. A light assembly is positioned over the substrate. The light assembly is configured to emit light into the cargo space and directly beneath the tailgate when the tailgate is in the open position.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Figure 1A:
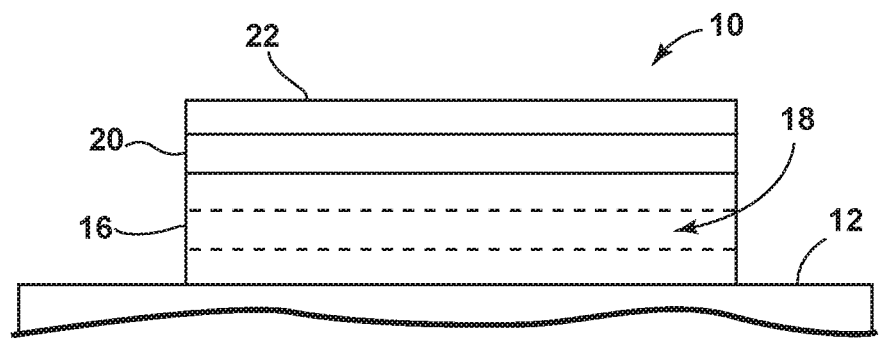
FIG. 1A is a side view of a photoluminescent structure rendered as a coating for use in an assembly according to one embodiment.
Figure 1B:
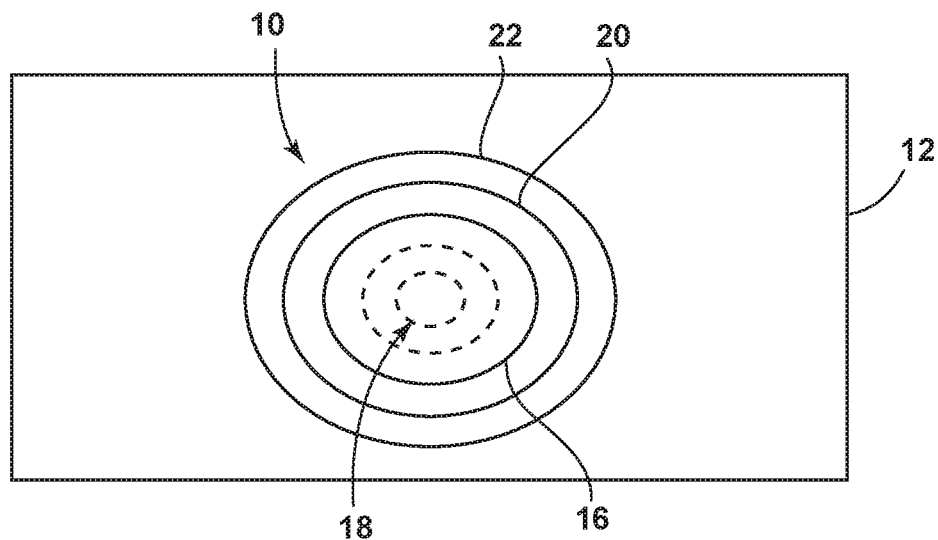
FIG. 1B is a top view of a photoluminescent structure rendered as a discrete particle according to one embodiment.
Figure 1C:
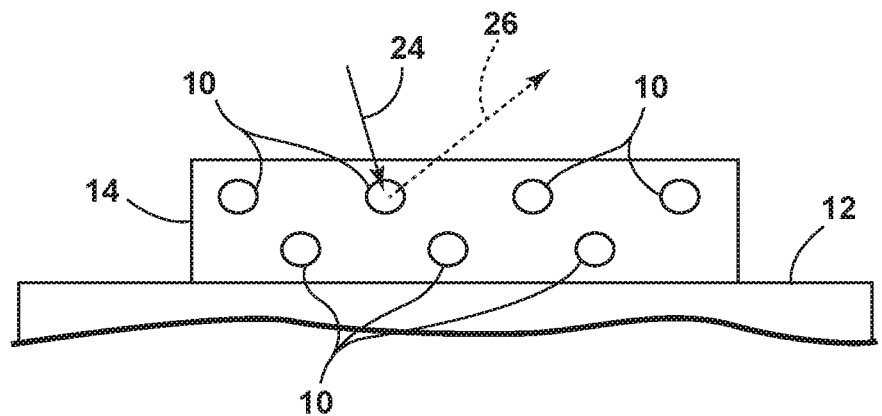
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle-related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4 D^1$ to $4 f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emits the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue-emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring now to FIGS. 2A-4, depicted is a vehicle 30 including a tailgate 34. The tailgate 34 includes a substrate 38 which is operable between open and closed positions. The substrate 38 defines an inboard surface 42, an outboard surface 46, and a top surface 50. A light assembly 54 is positioned on the substrate 38. The light assembly 54 includes a first lens 58 positioned over the inboard surface 42 and the top surface 50. A second lens 62 is positioned over the top surface 50 and the outboard surface 46. A plurality of light sources 66 are positioned between substrate 38 and the first and second lenses 58, 62.

Figure 2A:
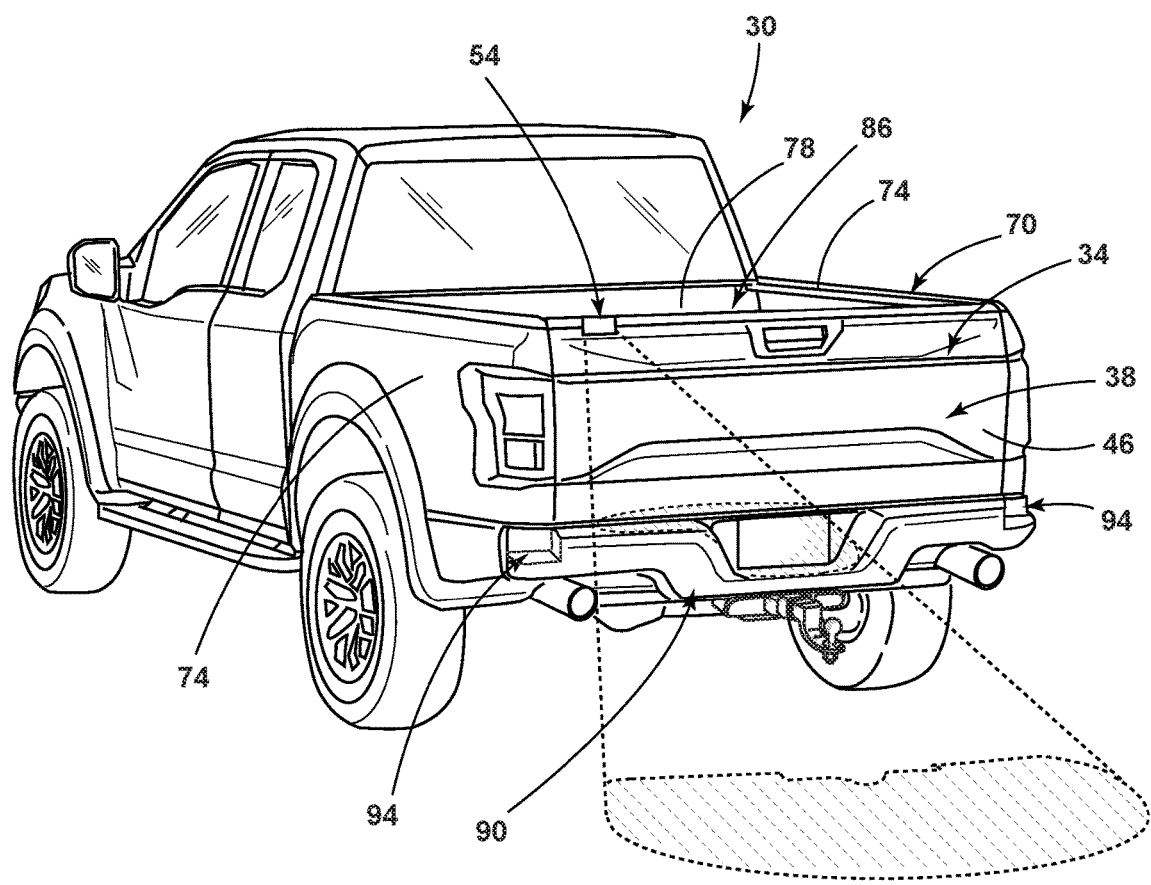
FIG. 2A is a rear perspective of a vehicle with a tailgate in a closed position, according to one example.
Figure 2B:
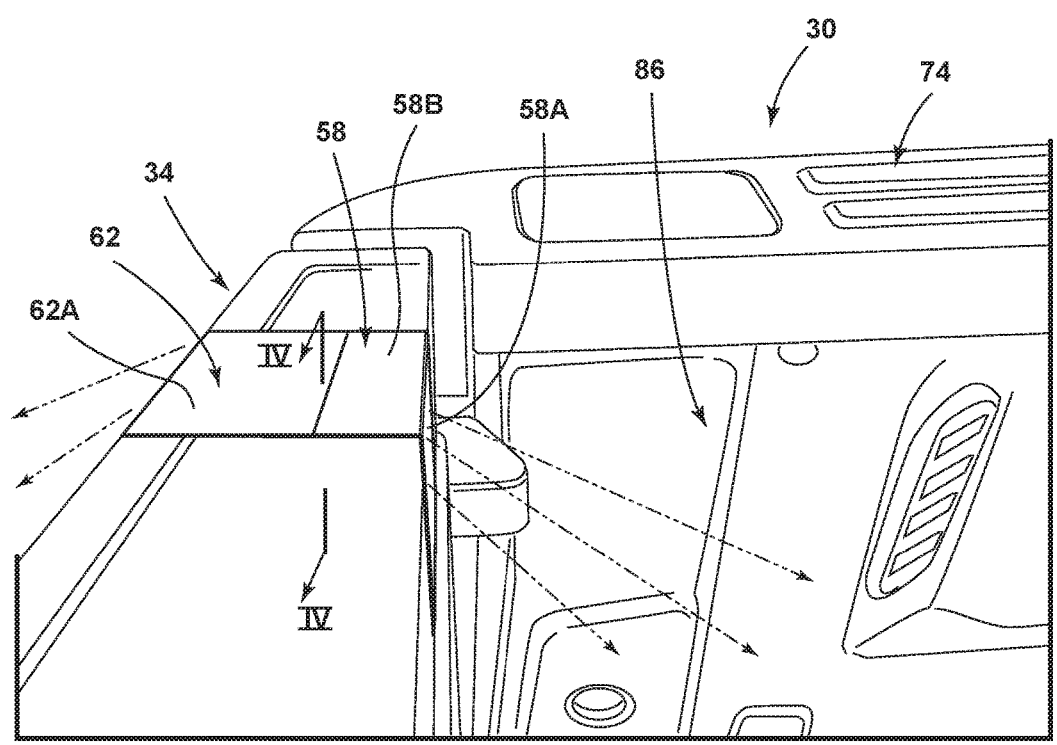
FIG. 2B is a side perspective view of a vehicle with a tailgate in a closed position, according to one example.
Figure 2C:
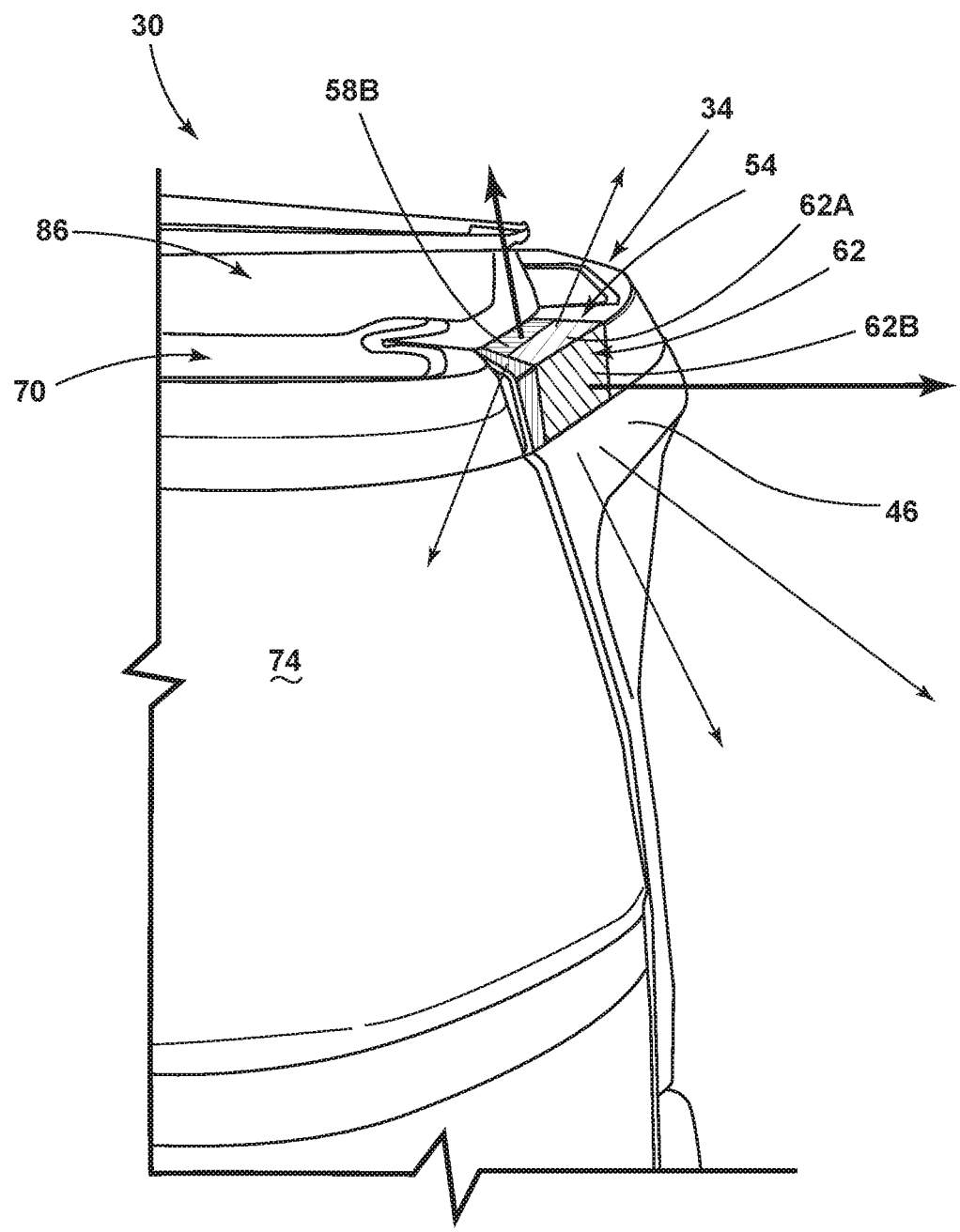
FIG. 2C is a side perspective view of a vehicle with a tailgate in a closed position, according to one example.
Figure 3A:
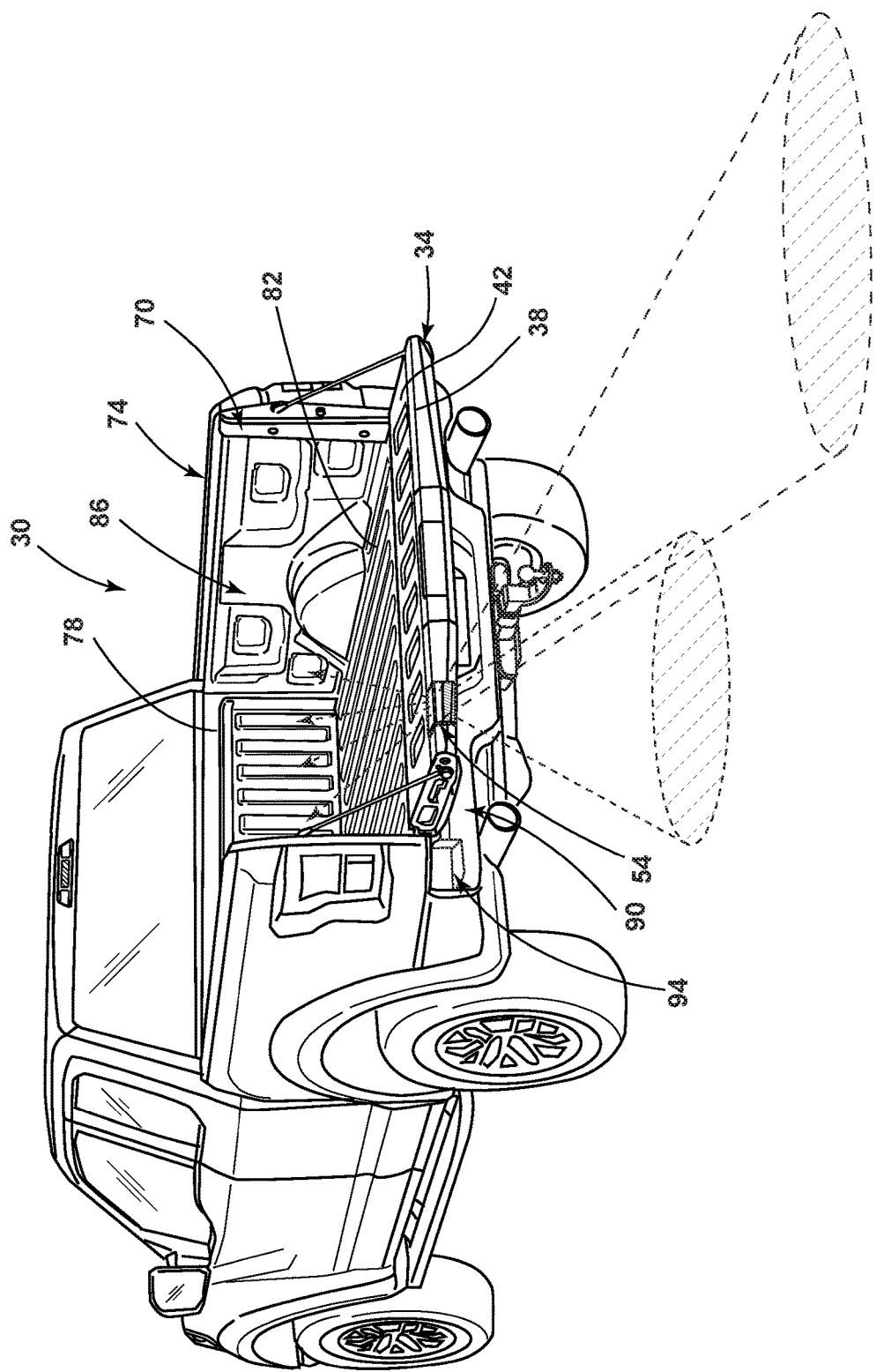
FIG. 3A is a rear perspective view of a vehicle with a tailgate in an open position, according to one example.

Referring now to FIGS. 2A and 2B, the vehicle 30 is depicted as a pickup truck, but it will be understood that the present disclosure may be equally applied to vehicles and vehicle accessories having cargo spaces such as trailers and the like. The tailgate 34 is shown as defining a rear wall of a cargo box 70. Positioned on both sides of the tailgate 34 are side walls 74. A front wall 78 may correspond to a cab of the vehicle 30, or may be a separate wall. Positioned at a base of the cargo box 70 may be a cargo surface 82 (FIG. 3A). Together, the tailgate 34, the side walls 74, the cargo surface 82 and the front wall 78 cooperate to define a cargo space 86 within the cargo box 70. The cargo space 86 and cargo surface 82 are configured to hold a variety of objects. As the tailgate 34 is operable between open and closed positions, access to the cargo space 86 may be increased or decreased depending on the position of the tailgate 34. A bumper 90 is positioned vehicle rearward of the cargo box 70 and below the tailgate 34. The bumper 90 may define one or more bumper steps 94 which may be utilized by an occupant or user of the vehicle to step up onto the bumper 90.

The light assembly 54 is positioned toward a top of the tailgate 34. In the depicted example, the light assembly 54 is depicted as covering only a portion of a top of the tailgate 34, but it will be understood that the light assembly 54 may extend across a majority, substantially all or across the entirety of the top of the tailgate 34. Further, although shown at the top of the tailgate 34, it will be understood that the presently disclosed light assembly 54 may equally be applied to side surfaces of the tailgate 34. In other words, the light assembly 54 may be applied to any perimeter portion of the tailgate 34. In the depicted example, the tailgate 34 includes a single light assembly 54, but it will be understood that a plurality of light assemblies 54 may be utilized around the perimeter of the tailgate 34 without departing from the teachings provided herein. For example, the plurality of light assemblies 54 may be spaced in a continuous or in an intermittent pattern around the perimeter of the tailgate 34.

The light assembly 54 is positioned over the top surface 50 of the substrate 38. The light assembly 54 is configured to provide illumination to a variety of locations around the vehicle 30. For example, the light assembly 54 may provide illumination to the cargo space 86 by projecting light in a vehicle forward direction into the cargo space 86 through the first lens 58. The light assembly 54 may also provide wash lighting to the outboard surface 46 of the tailgate 34 by projecting light in a vehicle rearward and downward direction through the second lens 62. Further, the wash lighting provided by the light assembly 54 may provide puddle lamp illumination of a ground beneath the vehicle 30 as well as area and task lighting for the bumper 90 and any associated trailer hitch. Such use may be advantageous in providing a user of the vehicle 30 illumination to use the bumper steps 94, navigate uneven terrain and use a trailer hitch. It will be understood that all of the illuminations described above may be provided separately and/or simultaneously. The illumination provided to the cargo space 86 and/or to the rear of the vehicle 30 (e.g., the outboard surface 46) may be uniform or may vary in intensity and/or color across the illuminated locations. For example, illumination provided to the cargo space 86 may have increased intensity and/or a different color to highlight attachment features (e.g., tie-down cleats) within the cargo box 70. Similarly, illumination provided to the rear of the vehicle 30 may vary in intensity and/or color proximate the trailer hitch and/or trailer electrical connections to highlight their location.

Figure 3B:
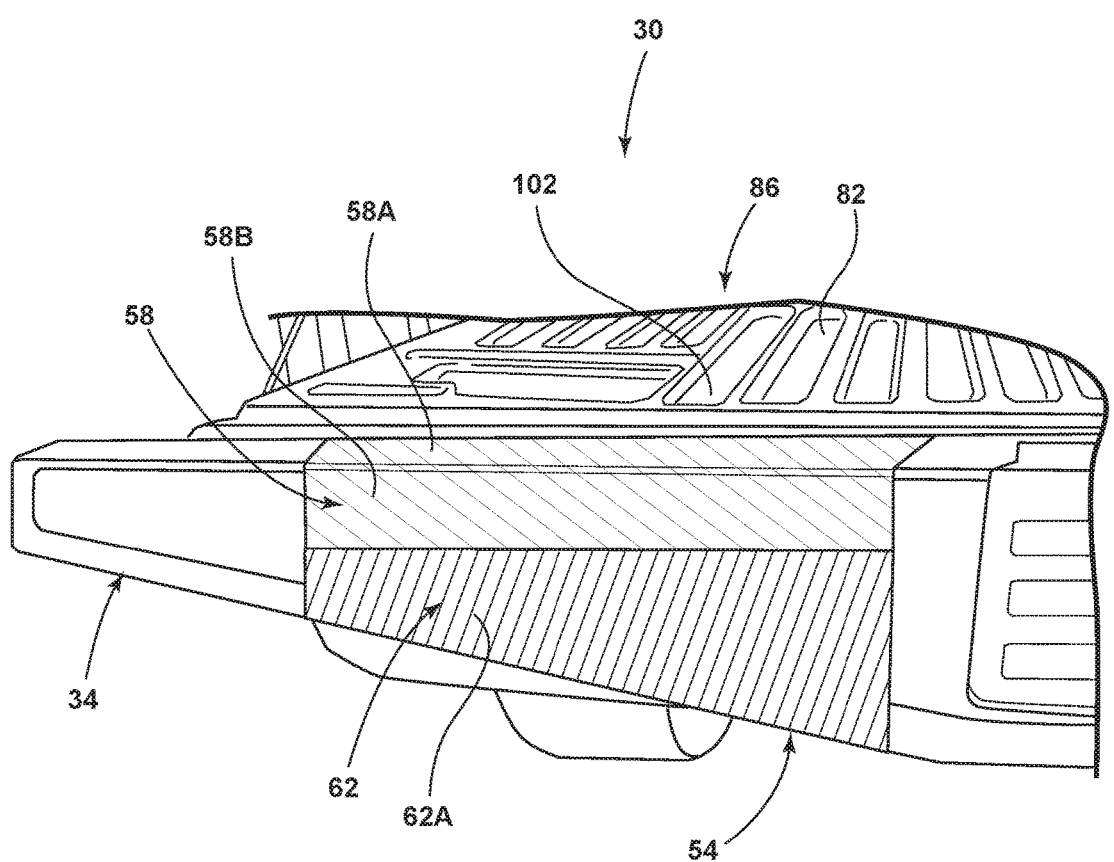
FIG. 3B is a rear perspective view of a top surface of a tailgate in an open position, according to one example.

Referring now to FIGS. 3A and 3B, the tailgate 34 is depicted in the open position. In the open position, the light assembly 54 of the tailgate 34 may provide the same and/or different illumination to the vehicle 30 as when the tailgate 34 is in the closed position. In the open position, the light assembly 54 may provide illumination to the cargo space 86, illuminate a space directly below the tailgate 34 as a puddle lamp and provide backup illumination. It will be understood that the light assembly 54 may provide each of the illuminations simultaneously and/or separately. As such, the light assembly 54 is configured to emit light into the cargo space 86 when the tailgate 34 is in either the open position or the closed position. The space directly beneath the tailgate 34 when the tailgate 34 is in the open position may be illuminated by the same illumination from the light assembly 54 that would have provided the wash light when the tailgate 34 is in the closed position. In other words, light emitted from the second lens 62 of the light assembly 54 may provide both the wash light while the tailgate 34 is in the open position, and the puddle lamp light while the tailgate 34 is in the closed position. Light may be emitted from a top of the light assembly 54 to provide the backup illumination. For example, as the tailgate 34 is rotated from the closed position to the open position, the top of the light assembly 54 is transitioned into facing rearward of the vehicle 30. As light is emitted from the top of the light assembly 54 while the tailgate 34 is in the open position, the light is emitted in the vehicle rearward direction which may be used to aid in backing of the vehicle 30. The backup illumination may be directed to illuminate a ground space behind the vehicle 30 between about 0.25 m behind the vehicle and about 10 m behind the vehicle 30.

Figure 4:
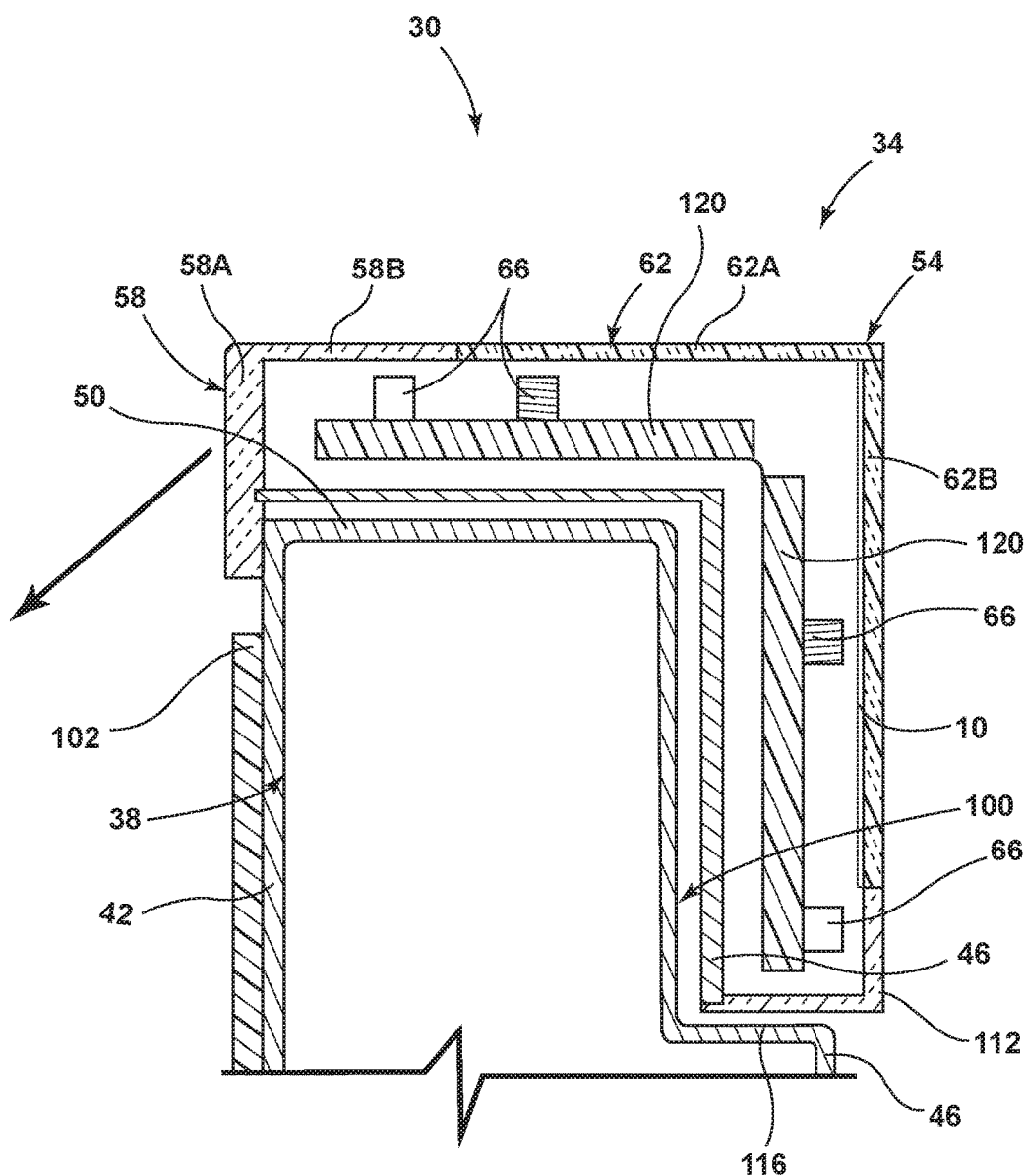
FIG. 4 is a cross-sectional view taken at line IV-IV of FIG. 2B, according to one example.

Referring now to FIG. 4, as explained above, the light assembly 54 is positioned on a top of the tailgate 34 for the tailgate substrate 38. The substrate 38 may be a single, continuous, piece of material or may be a collection of smaller components. The substrate 38 may be composed of a metallic material such as steel or aluminum. For example, the substrate 38 may be formed from one or more pieces of sheet metal. The substrate 38 functions essentially as a body of the tailgate 34. Substrate 38 defines the inboard surface 42, the outboard surface 46 and the top surface 50. For purposes of the present disclosure, the term inboard may be used to generally designate surfaces or structures which are generally proximate or closer to a center of the vehicle 30. Contrarily, the term outboard may be used to generally designate surfaces or structures which are generally proximate an exterior or away from a center of the vehicle 30 relative to the inboard structures. The substrate 38 may define a recessed area 100 in the outboard surface 46 and/or top surface 50 within which the light assembly 54 is positioned. It will be understood that the recessed area may additionally or alternatively be defined by the inboard surface 42 or a combination of the inboard, outboard and top surfaces 42, 46, 50. The recessed area 100 is determined relative to the rest of the substrate 38. The inboard and outboard surfaces 42, 46 may be substantially parallel to one another. The top surface 50 of the substrate 38 may be substantially perpendicular to both the inboard and outboard surfaces 42, 46.

In the depicted example, the light assembly 54 has a generally inverted "L" shape which is set into the recessed area 100 of the substrate 38. The light assembly 54 and the recessed area 100 area are shaped and sized such that the light assembly 54 is substantially flush with the remainder of the tailgate 34. In other words, the first and second lens 58, 62 may be substantially flush with major surfaces of the tailgate 34. The first lens 58 is positioned over the inboard surface 42 and the top surface 50 of the substrate 38. As such, the first lens 58 is positioned proximate the cargo space 86. The first lens 58 includes a first portion 58A and a second portion 58B. The first portion 58A is positioned over the inboard surface 42 and may have the same thickness as a bed liner 102 positioned within the cargo space 86. The first portion 58A may be provided with one or more sets of optics to allow light emitted from the first lens portion 58 of the light assembly 54 to illuminate the cargo space 86 when the tailgate 34 is in both the open and closed positions. Further, the disclosed optics may be used to collimate light onto attachment features located within the cargo space 86 of the cargo box 70 as described in greater detail above. The second portion 58B of the first lens 58 is positioned over the top surface 50 of the substrate 38. The second portion 58B is configured to allow light emitted from the light sources 66 to be emitted in a vertical direction from the top of the tailgate 34 when the tailgate 34 is in the closed position, and allow light to be emitted in a vehicle rearward direction when the tailgate 34 is in the open position. For example, light from the second portion 58B of the first lens 58 may provide the light for the backup illumination.

The light assembly 54 includes the second lens 62. The second lens 62 is positioned over the top surface 50 and the outboard surface 46 of the substrate 38. As such, the second lens 62 is positioned proximate a rear exterior of the vehicle 30. The second lens 62 includes both third portion 62A and a fourth portion 62B. The third portion 62A is generally positioned above the top surface 50 and the fourth portion 62B is generally positioned over the outboard surface 46. The fourth portion 62B may include one or more sets of optics configured to create the wash light across the outboard surface 46 of the tailgate 34 when the tailgate 34 is in the closed position and also create the puddle lamp in the space directly beneath the tailgate 34 when the tailgate 34 is in the open position. Further, the optics may collimate lights onto the bumper steps 94 and/or trailer hitch as explained in greater detail above. Similarly, the third portion 62A may include optics to collimate light to provide the backup illumination described above.

Positioned beneath the second lens 62 is third lens 112. The third lens 112 may be positioned proximate a bottom surface 116 of the substrate 38 which defines the recessed area 100. In the depicted example, the third lens 112 extends into the recessed area 100 proximate the bottom surface 116. The third lens 112 may rest on the bottom surface 116 to support the light assembly 54. As such, the light assembly 54 has the first, second and third lenses 58, 62, 112 extending over the inboard and outboard surfaces 42, 46.

The first, second and third lenses 58, 62, 112 may be a variety of colors and/or transparencies. For example, the lenses 58, 62, 112 may be clear, red, amber, combinations thereof or other colors. In some examples, the lenses 58, 62, 112 may be a single color across the body of the lens while in other examples the lenses may have different colors across the body of the lenses. In other words, each of the lens 58, 62, 112 may be a single color or a plurality of colors. According to various examples, each of the lenses 58, 62, 112 is a different color than the other lenses. In a specific example, the first and third lenses 58, 112 may be clear while the second lens 108 may be red. The lenses 58, 62, 112 may include one or more indicia (e.g., symbols, alphanumeric text, pictures, logos, etc.) which may be illuminated by the light sources 66 or which may project an image in the cargo space 86, onto the outboard surface 42 of the tailgate 34 or onto any surface of the vehicle 30.

According to various examples, the photoluminescent structure 10 may be positioned on at least one of the lenses 58, 62, 112. The photoluminescent structure 10 may be positioned on either an interior surface, an exterior surface or both surfaces of one of the lenses 58, 62, 112. In such an example, the light sources 66 may be configured to emit the excitation source and/or a color which will pass through and/or excite the photoluminescent structure 10 and be used for color mixing. The photoluminescent structure 10 may be configured as an even coating across one or more of the lenses 58, 62, 112 or may be configured as an indicia or other symbol as explained above. Use of the photoluminescent structure 10 may be advantageous in providing a smooth or even lighting to the light assembly 54. Further, use of the photoluminescent structure 10 may provide illumination to enhance (e.g., through differences in color or intensity of light) features around the vehicle 30 (e.g., trailer hitch, tie-down cleats, a handle on the tailgate 34, etc.).

A printed circuit board 120 is positioned between the substrate 38 and the lenses 58, 62, 112. The plurality of light sources 66 are positioned on the printed circuit board 120 such that the light sources 66 are between the substrate 38 and the lenses 58, 62, 112. The printed circuit board 120 is positioned over the outboard surface 46 and the top surface 50. In order to be positioned over both the outboard and top surfaces 46, 50, the printed circuit board 120 may be scored and bent. Each of the lenses 58, 62, 112 may have a single or multiple light sources 66. Each of the light sources 66 on the printed circuit board 120 may emit the same wavelength of light, or a different wavelength of light. In examples where there are multiple light sources 66 per lens 58, 62, 112, each light source may emit the same wavelength of light or a different wavelength of light. Further, each light source 66 may emit light in a different direction. Each light source 66 may be activated individually.

Figure 5:
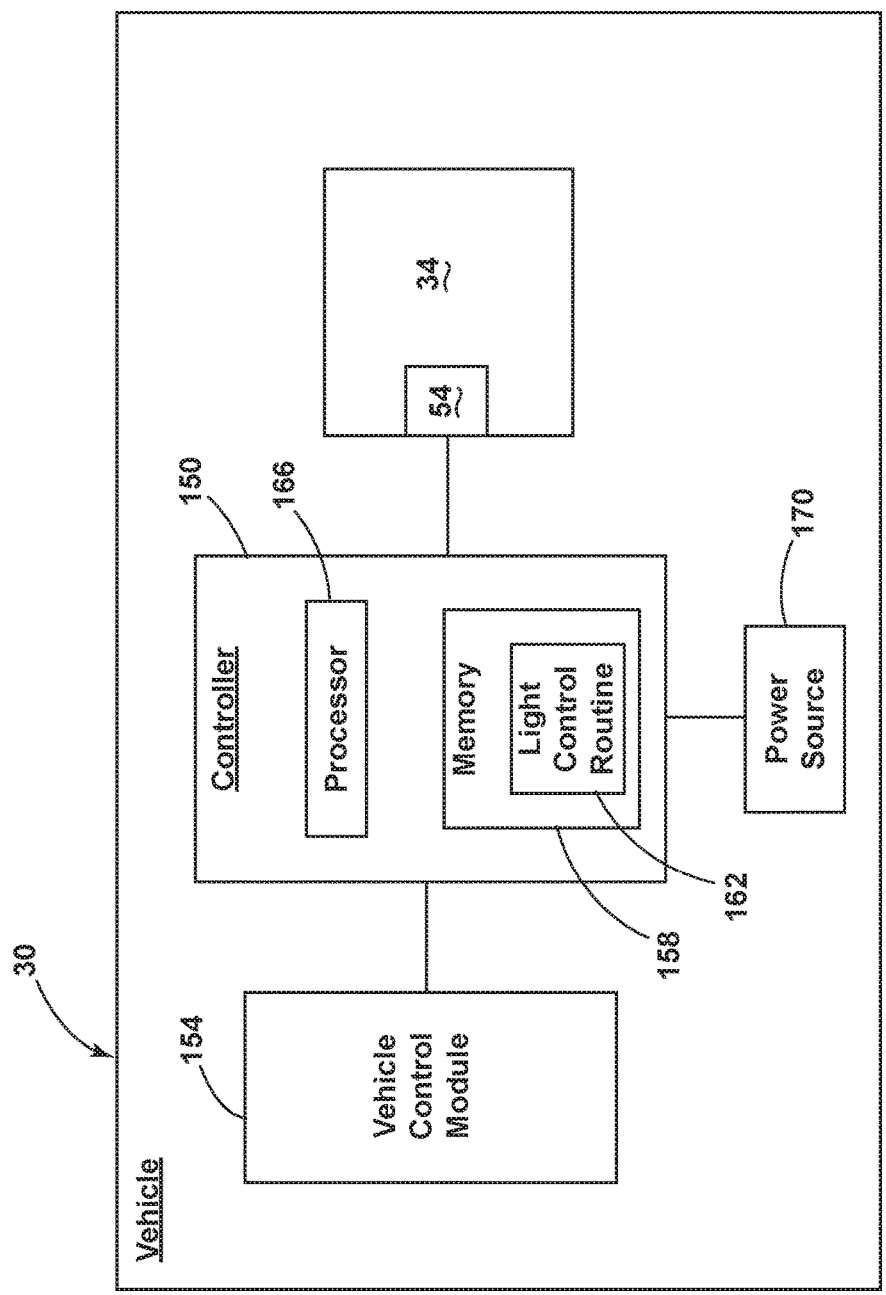
FIG. 5 is a block diagram of the vehicle, according to one example.

Referring now to FIG. 5, depicted is a block diagram of the vehicle 30 in which the light assembly 54 is implemented. The vehicle 30 includes a controller 150 in communication with one or more vehicle control modules 154. The vehicle control module 154 may be configured to relay information to the controller 150 from a variety of sensors (e.g., braking, speed, proximity, cargo box weight, day/night, tailgate position, etc.) positioned around the vehicle 30. The controller 150 may include a memory 158 having a light control routine 162 contained therein that is executed by a processor 166 of the controller 150. The controller 150 may provide electrical power to the lighting assembly 54 via a power source 170 located onboard the vehicle 30. In addition, the controller 150 may be configured to control the light emitted from the lighting assembly 54 based on feedback received from the vehicle control module 154. The light control routine 162 may include a variety of routines configured to cause the controller 150 to vary the intensity and/or color of the light emitted from the light assembly 54. In one example, if the tailgate 34 is in the closed position, the controller 150 may cause the light assembly 54 to emit light into the cargo space 86 and onto a rear (e.g., as a wash light down the outboard surface 46) of the vehicle 30 simultaneously. In another example, if the tailgate 34 is in the open position, the controller 150 may control the light assembly 54 to emit light into the cargo space 86 as well as form a puddle lamp on the ground directly beneath the open tailgate 34. Further, if motion is detected rearward of the open tailgate 34 or if the vehicle 30 is in a reverse drive gear, the light assembly 54 may emit backing illumination out of the top of the light source 54 in a vehicle rearward direction. Such an example may be advantageous in illuminating space behind the vehicle 30 while it is backing. It will be understood that the light assembly 54 may also emit light in a vehicle rearward direction while the tailgate 34 is in the closed position. In another example, if the vehicle 30 is detected in a drive gear, the controller 150 may control the light source 54 to emit light in the vehicle rearward direction and washed down along the outboard surface 46 of the tailgate 34 to function as running lights. In such an example, the light may be red or amber in color. Further, if the vehicle 30 is detected braking, the intensity and/or color of the light emitted from the light assembly 54 may be changed to indicate that the vehicle 30 is braking. For example, the light emitted from the light assembly 54 may change to red or increase in intensity. Such a use may be advantageous in providing a larger area over which to indicate to another driver that the vehicle 30 is braking. In another example, if motion is detected proximate a rear or side exterior of the vehicle 30 (e.g., through backup sensors or the like), the controller 150 may activate the light assembly 54 to only emit light in the vehicle rearward and sideward direction (i.e., not into the cargo space 86) to provide area illumination for users of the vehicle 30 who are behind the vehicle 30. It will be understood that the controller 150 may activate the light assembly 54 to only emit light into the cargo space 86. In yet another example, if the vehicle 30 is in a reverse gear and backup sensors detect an object or person proximate a rear of the vehicle 30, the light assembly 54 may be configured to flash and/or change intensity to indicate to a drive or viewer of the vehicle 30 the detection of the object or person.

Use of the present disclosure may offer a variety of advantages. First, use of the presently disclosed light assembly 54 may provide puddle lamp functionality even in times when the tailgate 34 is in the open position. Second, use of the presently disclosed light assembly 54 provides superior lighting on a tailgate 34 so that auxiliary running, auxiliary backup, puddle lamps and cargo space 86 illumination are provided when the tailgate 34 is in either the open and closed positions. Third, the light assembly 54 may provide illumination to the rear of the vehicle 30 which may be used by a backup camera when the tailgate 34 is in either the open or closed positions. Fourth, the light assembly 54 as described above may equally be applied to the side walls 74 of the vehicle 30. Fifth, by scoring and bending the printed circuit board 120, the costs to produce the light assembly 54 may be reduced.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

What is claimed is:

1. A vehicle tailgate, comprising:
a substrate operable between open and closed positions of the tailgate defining an inboard surface, an outboard surface and a top surface; and
a light assembly positioned on the substrate, comprising:
a first lens positioned over the inboard surface and the top surface;
a second lens positioned over the top surface and the outboard surface; and
a plurality of light sources positioned between the substrate and the first and second lenses.

2. The vehicle tailgate of claim 1, wherein the inboard surface and the top surface are substantially perpendicular.

3. The vehicle tailgate of claim 1, wherein the outboard surface and the top surface are substantially perpendicular.

4. The vehicle tailgate of claim 1, further comprising:
a photoluminescent structure positioned on at least one of the first and second lenses.

5. The vehicle tailgate of claim 1, further comprising:
a printed circuit board positioned over the outboard and top surfaces.

6. The vehicle tailgate of claim 5, wherein the printed circuit board is bent around the outboard and top surfaces.

7. The vehicle tailgate of claim 6, wherein the light sources are positioned on the printed circuit board.

8. The vehicle tailgate of claim 1, wherein the light assembly is configured to emit light into a cargo space proximate the tailgate when the tailgate is in both the open and closed positions.

9. A vehicle comprising:
a cargo box defining a cargo space;
a tailgate substrate coupled to the cargo box and operable between open and closed positions and defining an inboard, an outboard and a top surface; and
a light assembly comprising a composite of adjacent lenses disposed over the inboard, outboard and top surfaces, wherein the light assembly is configured to emit light into the cargo space when the tailgate is in both the open and closed positions.

10. The vehicle of claim 9, wherein the tailgate defines a recessed area within which the light assembly is positioned.

11. The vehicle of claim 9, wherein the light assembly is positioned over a top surface of the tailgate substrate.

12. The vehicle of claim 9, wherein the light assembly comprises a first lens positioned over the inboard surface and the top surface.

13. The vehicle of claim 12, wherein the light assembly further comprises a second lens positioned over the top surface and the outboard surface.

14. The vehicle of claim 13, wherein the first and third lenses are clear.

15. A vehicle comprising:
a cargo box defining a cargo space; and
a tailgate coupled to the cargo box and operable between open and closed positions, the tailgate comprising:
a substrate defining an inboard surface, an outboard surface and a top surface; and
a light assembly positioned over the substrate including a plurality of lenses extending over the inboard and outboard surfaces, wherein the light assembly is configured to emit light into the cargo space and directly beneath the tailgate when the tailgate is in the open position, wherein a printed circuit board is bent around the outboard and top surfaces.

16. The vehicle of claim 15, wherein a plurality of light sources are positioned between the substrate and the lenses.

17. The vehicle of claim 16, wherein at least one of the lenses is a different color than the other lenses.

18. The vehicle of claim 17, further comprising:
a photoluminescent structure positioned on at least one of the plurality of lenses.

* * * * *